Jan. 18, 1944.　　　C. E. LINDEN ET AL　　　2,339,604
HYDRAULIC GEAR SHIFTING AND DRIVING SYSTEM
Filed Oct. 14, 1940　　　6 Sheets-Sheet 1

Fig. 1

INVENTORS
BY Carl E. Linden
Raymond N. McClellan
Wood & Wood　ATTORNEYS

Jan. 18, 1944.   C. E. LINDEN ET AL   2,339,604
HYDRAULIC GEAR SHIFTING AND DRIVING SYSTEM
Filed Oct. 14, 1940   6 Sheets-Sheet 4

Fig. 11

INVENTORS
Carl E. Linden
BY Raymond N. McClellan
Wood & Wood ATTORNEYS

Jan. 18, 1944.  C. E. LINDEN ET AL  2,339,604
HYDRAULIC GEAR SHIFTING AND DRIVING SYSTEM
Filed Oct. 14, 1940  6 Sheets-Sheet 5

INVENTORS
Carl E. Linden
Raymond N. McClellan
BY Work & Work ATTORNEYS

Patented Jan. 18, 1944

2,339,604

UNITED STATES PATENT OFFICE 2,339,604

HYDRAULIC GEAR SHIFTING AND DRIVING SYSTEM

Carl E. Linden, Norwood, and Raymond H. McClellan, Hamilton, Ohio, assignors to The Fosdick Machine Tool Company, Cincinnati, Ohio, a corporation of Ohio Application October 14, 1940, Serial No. 361,044

16 Claims. (Cl. 10—129)

This invention relates to gear shifting and is particularly directed to hydraulic apparatus for this purpose. More particularly, the invention is directed to a fluid system, including valves and shifting means for bringing about the shifting of the gears, and at the same time, controlling the pressure, whereby it is suitable either for shifting gears or for driving the feed mechanism of a drill spindle or the like. The hydraulic pressure employed for shifting the gears must be lower than that employed for driving a spindle feeding fluid motor in order to avoid undue shock in shifting and to prevent breakage of the shifting mechanism.

Accordingly, it has been one of the objects of the present inventors to provide a pressure-controlled and controlling apparatus in the hydraulic circuit. This mechanism is automatic and is effective for changing the pressure, preferably when a main clutch lever; that is, the clutch lever controlling a drill spindle drive, is operated. When the lever is in an intermediate or neutral range, which may be called the gear-shifting range, pressure is lowered. When the clutch is shifted to either forward or reverse, at which times the fluid is connected to the feed drive for the spindle, the mechanism is effective for raising the pressure. At these times, the fluid is cut off from the hydraulic gear-shifting portion of the mechanism and no damage can result.

It has been a further object of the inventors to provide a system for hydraulic gear-shifting or driving, wherein the fluid is normally by-passed when the shifting or driving operations are not being performed, and wherein a relief valve permits this by-passing and automatically closes instantly when an operation is started, so as to provide the proper pressure for the particular operation.

As has been recognized in the past, it is desirable to provide for preselection of gears; that is to say, the operator should be able to move the speed selector lever to set the valve at the desired speed regardless of the position of the main clutch lever. Accordingly, it has been an object of the present inventors to provide for preselection, the apparatus including for this purpose a manually operated shifting control valve, having its handle located in a readily accessible position, whereby the operator may bring about the shift when he desires, assuming, of course, that the main clutch lever is in the neutral range; that is, the spindle driving means is unclutched.

Likewise, it is provided that this manually controlled shifting valve is immediately returned to closed position when released. In this arrangement, there is no possibility of the shifting pressure passing through to the gear-shifting devices unless the clutch lever is in neutral and the shifting control valve is open. Thus, any possibility of improper operation is eliminated.

It has been a further object of these inventors to provide an improved gear shifting valve for controlling the application of hydraulic pressure. In this phase of the invention, a valve has been provided which can accomplish a great number of shifts through a very compact arrangement of valve elements. One embodiment of the concept, and the preferred one, consists of a pair of valve elements operated through the same setting means, one of these elements being indexed in any one of a number of positions each time the other is rotated through a complete revolution. By locating these valves on the same axis and in the same casing, the valve arrangement is made compact and unified.

Other phases of the invention relate to the structure of the valve casing and movable elements, wherein an improved arrangement and relationship of the ports and passageways is provided.

Other objects of the present invention relate generally to the arrangement of the various elements for bringing about the control of the degree of pressure for gear shifting and spindle operation, wherein a minimum number of operating elements are required, and wherein the apparatus operates efficiently without any chance of mishandling or failure to operate in the prescribed manner.

Hydraulic feed driving means is highly desirable in that an infinite range of speeds may be obtained. The rate of spindle feed may be delicately adjusted through a needle valve or the like. However, it is necessary that provision be made for tap lead feeds, and in this case, it is desirable that the feeds be mechanically driven from the spindle so that the rate of feed is directly proportional to the rate of spindle speed. When the spindle is being driven in any of the high speeds, it would be undesirable to engage any of the tap leads, because of the possibilities of tool breakage and the strain which would be placed on the machine.

Accordingly, it has been another object of the present inventors to provide a hydraulic spindle feeding mechanism, which can be delicately controlled by means of a throttle valve, and at the same time, to provide means for converting the drive from hydraulic to mechanical for the purpose of the feeds for tap leads. Also, it has been the object to provide a safety or lockout device for preventing shifting or coupling of the driving means to the tap lead transmission when the spindle is being driven in the high speed range. Accordingly, it will be impossible to shift from the hydraulic feeding means to the tap lead feeds when the hydraulic feeding means is operating at high speed.

Other objects and certain advantages of the invention will be more fully apparent from the description of the drawings in which.

Generally described, the present apparatus provides a source of hydraulic pressure, such as a pump which may be driven by the spindle transmission. This pump delivers the fluid through a vented type relief valve which either by-passes the supply or directs it into the system for shifting the gears and for driving the feed drive motor. The delivery of the fluid is controlled manually through the clutch lever which either directs it to the feed drive at the time the clutch is connected for forward or reverse, or delivers it to the gear-shifting control valve when the clutch lever is in neutral. The latter delivery is controlled by a manually actuated valve at the option of the operator.

In other words, the present apparatus permits setting of the gear-shifting valve prior to the completion of the shift and only permits shifting when the main clutch lever is at neutral and the manually operated valve is held open. A pressure regulating valve is interposed in the fluid line, leading to the selector valve and is effective for accomplishing low gear-shifting pressure and relatively high hydraulic motor driving pressure for a spindle or the like.

Figure 16:
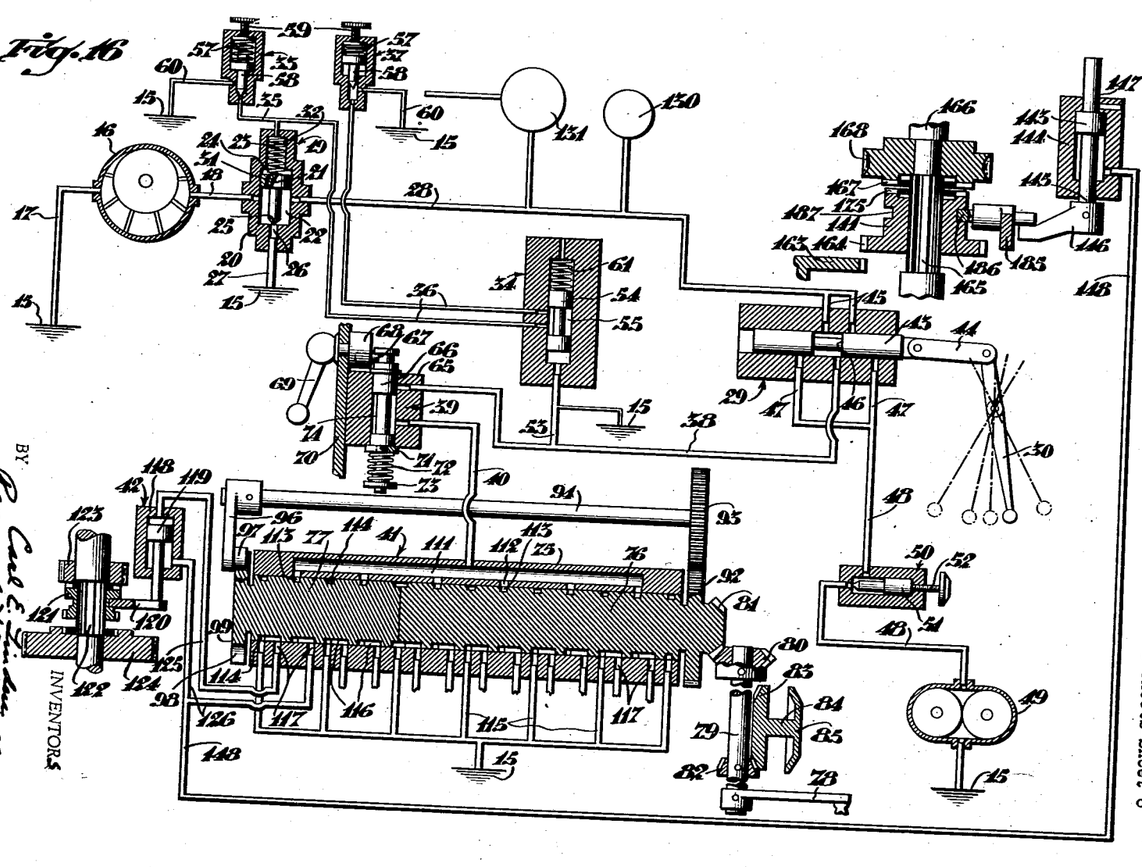
Figure 16 is a diagrammatic view showing the hydraulic circuit and the various valve elements and operating means.

Referring to the drawings, the sump or fluid reservoir is diagrammatically shown in Figure 16 at 15. The pump 16 has its intake pipe 17 extended to the sump 15. Its delivery pipe 18 delivers the fluid into a relief valve 19 of the vented type. This valve 19 incorporates a casing 20 and a valve element 21 operating in a chamber 22 and urged into closed position by means of a spring 23. The casing includes a shoulder 24 against which the valve rests when the fluid is being by-passed. The valve element 21 includes a tapered seating extension 25 adapted to engage over a by-pass outlet 26 from which a pipe 27 leads to the sump 15. The main delivery pipe 28 extends from the chamber 22 diametrically opposite the pipe 18. This pipe 28 extends to the main control valve 29, operated by the clutch lever 30. Normally, some of the fluid from the pump 16 is delivered through pipe 18 into the chamber 22 and out through the exhaust or by-pass 27.

Figure 1:
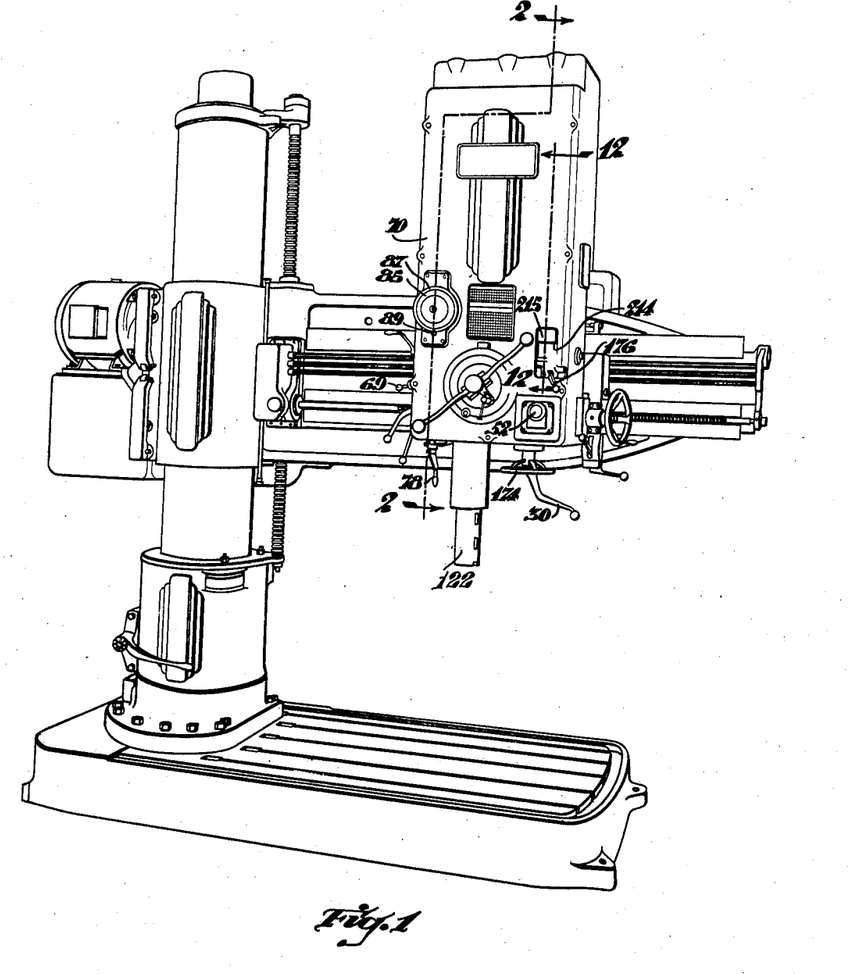
Figure 1 is a general perspective view, illustrating a radial drill incorporating the improved gear-shifting and control mechanism of this invention.

The spindle, generally indicated at 122 later on in the description, is driven in the usual conventional manner by means of power on the arm, such as an electric motor shown in Figure 1. It is not believed necessary to describe this transmission of power in detail. The clutch lever 30 shown in Figure 1, in addition to shifting the conventional clutch, also operates the valve element 43 of the valve 29 shown in Figure 16. The clutch referred to controls the connection of the power to the spindle.

Now, in order for the delivery of fluid to take place through line 28 for building up a shifting or driving pressure, it is necessary for the valve 21 to close. Closing of this valve occurs when there is fluid pressure balance above and below the valve 21, and the spring 23 is effective. For this purpose, the valve 21 is vented as at 31, permitting the fluid to pass through it to the chamber 32 above the valve. The chamber 32, containing the spring above the valve, is connected to either one of two valves 33 and 37, which unload respectively in a high pressure range such as 500–600 pounds per square inch and a low pressure range of 125–175 pounds pressure per square inch. An automatic pressure control valve 34 controls the connection of the chamber 32 to the respective unloading valves.

When the line 28 is blocked; that is to say, the oil accumulates under pressure beneath the valve 21, the valve element 21 remains off the seat, the oil by-passing through the pipe 27. Relief of the chamber 32 takes place at the pressures at which valves 33 and 37 are set to unload, and this permits the pumping pressure to hold the valve element 21 away from its exhaust seat.

A pipe 35 connects the valve 19 to unloader valve 33, and a pipe 36 extends from the pipe 35 to the unloader valve 37 through the automatic control valve 34.

The delivery pipe 28 extends to the valve 29, and the pipe 38 extends from the valve 29 through a manually operated gear shift control valve 39, which in turn is connected to the selector valve by way of a pipe 40. From the selector valve 41, the oil is distributed as directed by the control passageways to the shifting devices, one of which is indicated, at 42. The main clutch lever 30, operating the clutch which controls the power connection to the spindle is connected to the valve element 43 of the valve 29 by means of a link 44. The line 28 branches as at 45 for delivering the fluid into the bore of the valve 29 over an intermediate portion of its length. The pipe 38 extends from the bore, intermediate the inlets of the branch passageways 45. The valve element 43 includes an annular circumferential groove 46 of some length intermediate thereof. Thus, through an intermediate portion of the swing of the clutch lever, representing the neutral position of the clutch, the valve may be moved without disturbing the flow through to the control valve 39 and the selector valve 41.

At either side of the pipe 38, where it enters the valve 29, the branch passageways 47—47 connect to a main pipe 48, extending to the feed drive motor 49, from which the oil is delivered back to the sump 15. A feed rate control or throttle valve 50 is interposed in the line 48. The valve element 51 of the valve 50 may be rotated in screw threads 52 for adjusting the rate of flow of the oil to the motor 49. Thus, when the main clutch lever is moved to either forward or reverse drive positions, the oil is connected for delivery to the feed drive motor, for at that time, the annular groove 46 connects branch passageways 45 with one of the branch passageways 47. Obviously, the flow to the gear-shifting mechanism is cut off at either of these positions.

As stated heretofore, it is requisite that the pressure be low for gear shifting and high for motor driving. In order to bring this about, the automatically-operated, pressure-controlled valve 34 is connected to the gear shift delivery line 38 by means of a pipe 53. This valve 34 includes a valve element 54 which is shuttled back and forth between two positions. When the oil is flowing through to the gear shifting side of the apparatus and live oil is in the pipe 38, the valve element 54 will take the position shown in the drawings (Figure 16). At this time, the oil above the valve element 21 of the relief valve 19 may pass through the line 36 into an annular groove 55 in the shuttle valve element 54 and to the low pressure unloader valve 37.

The valves 33 and 37 are duplicates except for the weight and tension of their respective springs 57—57. They consist in each case of a needle type valve element 58, normally urged downwardly by means of the spring 57 to block the flow of fluid through a bore. The tension of the respective springs is set in each case by means of a set screw 59 including a thrust head, movable toward and from the valve element. In each case, the respective pipes 35 and 36 exhaust the oil to the sump 15 through pipes 60—60. The valve 37, as stated, is set to unload at low pressures, such as 125-175 pounds per square inch.

Now, as the valve element 43 of the main control valve is shifted to feed drive positions, the oil supply to the automatic pressure-controlled valve 34 is cut off and the spring 61 of the automatic valve will move the shuttle valve element 54 downward so as to block the flow of oil to the unloader valve 37. At this time, the only point at which the pressure may be relieved or unloaded is at the valve 33, which is set to unload in the high pressure feed driving range. The oil may bleed back into the sump 15 from the lower portion of the bore of the automatic valve to permit return of the valve. This bleeding, however, is not sufficient to interfere with the normal operation of the system.

When the high pressure condition exists, the chamber above the valve 21 of the relief valve is only connected to the unloader valve 33, and the unloading must take place through this valve. Accordingly, the oil is delivered to the feed drive motor at the higher pressure.

The shifting control valve 39 consists of a casing 65, in which a valve element 66 is slidably mounted. The valve element, externally of the casing, includes an annular groove engaged by the pin 67 of an arm 68. The arm is swung by means of the hand lever 69 journalled in the side wall of the head stock casing 70. The valve element includes upper and lower external shoulders, the lower shoulder consisting of a slidably mounted washer element 71 normally held in its abutting position by means of a coil spring 72. This spring is held under pressure, against the washer 71, about the lower extended end of the valve element by a washer 73, fixed on the valve element. Thus, the valve element may be lifted for moving the annular groove 74 thereof into position, connecting the pipes 38 and 40, but will be returned to shut-off position when the handle is released by means of the spring 72. When the valve is open, the oil flows into the selector valve.

The selector valve comprises, generally, a casing 75 and a pair of rotatable valve elements 76—77 in the casing, disposed in end-to-end abutment; that is, on the same axis. A selector crank lever 78 is pinned to the lower end of a rod 79. The upper end of the rod carries a bevel gear 80, meshing with a bevel gear 81 on the axis of the valve elements. A second bevel gear 82 is pinned to the shaft 79 and meshes with a bevel ring gear 83, fixed to a shaft 84, carrying the indicator 85. The gears 82 and 83 are disposed in a casing 86 (Figure 2) mounted about and traversed by the shafts 79 and 84. A circular frame element 87 is attached to the front face of the head stock casing 70, and the indicator dial rotates within and adjacent the opening 88 in the element 87. The graduations, indicating speeds from 15 R. P. M. to 1,000 R. P. M. are arranged around the tapered marginal face of the dial and move relative to an indicator finger 89, fixed to the frame element.

The gear 81 which drives the gear elements is in splined connection with a shaft 90, extended through the valve elements and supported therein. This gear 81 is rotatively mounted in a bearing sleeve 91.

The other valve element 77 is rotated through the following arrangement: A gear 92 is fixed to the shaft 90. This gear meshes with another gear 93, fixed to one end of a shaft 94, journalled in upwardly extending arms 95 respectively at each end of the valve body 75. The other end of the shaft 94 carries the driving arm 96 of a Geneva gear mechanism. The roller 97 on the end of the arm is adapted to successively engage (Figure 3) the notches 98 of the Geneva gear element 99. This Geneva gear element is formed at the outer end of a sleeve element 100, extended into the bore of the valve element 77 and in splined connection therewith. The ends of the valve body are closed by means of heads 101, which heads form the bearings for the gear 92 and the Geneva gear element 99. A collar 102 is pinned to the end of the shaft and holds the element 99 in position.

Figures 2, 3, 4:
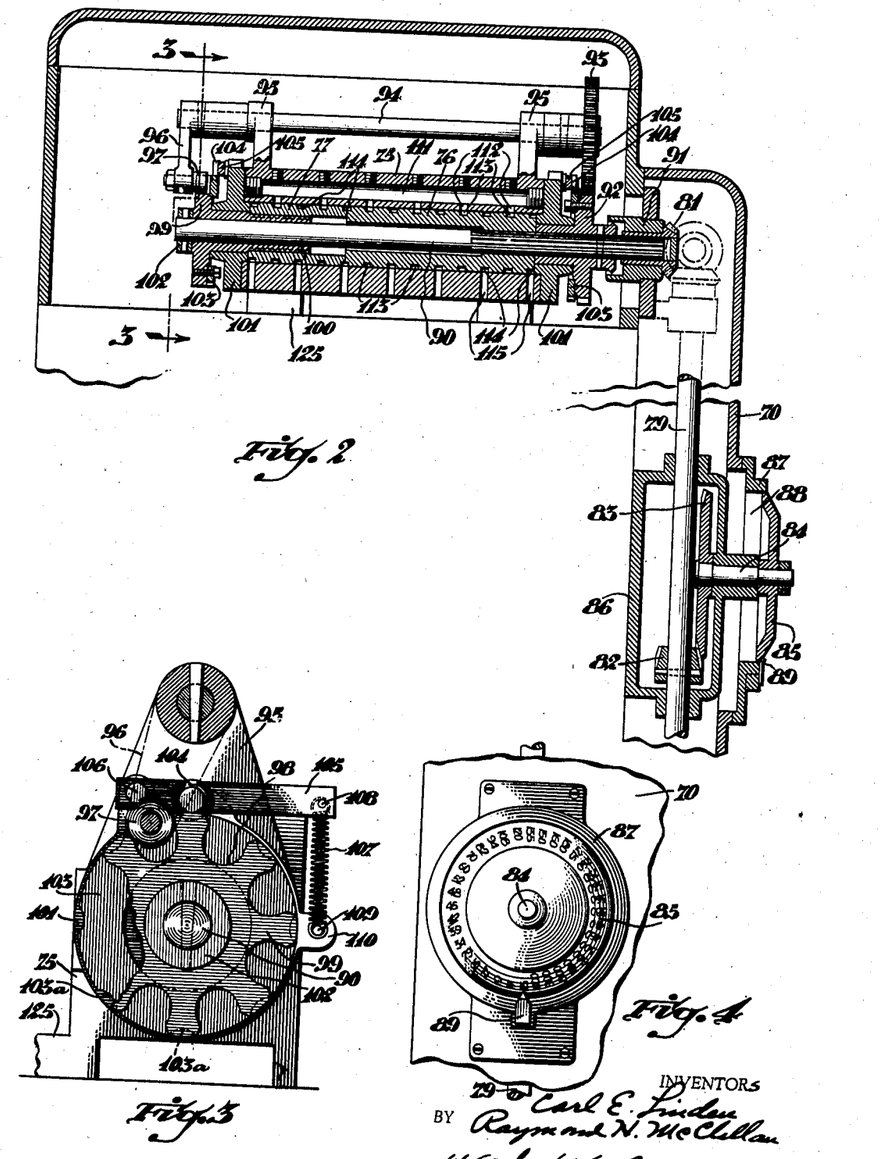
Figure 2 is a fragmentary sectional view taken on line 2—2 through the head, illustrating the mounting and relationship of the selector valve, its operating means, and the indicator device.
Figure 3 is a sectional view taken on line 3—3, Figure 2, illustrating in detail the indexing and operating means of Geneva gear form for moving one of the valve elements to one of eight different positions upon each rotation of the other valve element.
Figure 4 is a fragmentary face view of the indicator.
Figure 5:
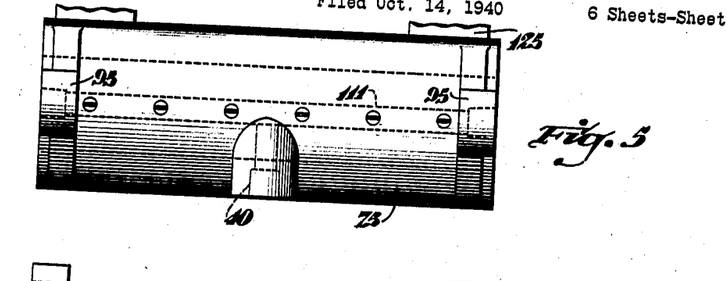
Figure 5 is a top plan view of the valve body.

Both the gear 92 and the Geneva gear element 99 carry indexing or detent plates 103. These plates include arcuate notches 103a in their peripheries, one for each notch of the Geneva gear. A detent roller 104 is axially mounted on an intermediate portion of an arm 105, pivoted on a pin 106 in a lug of the head 101. The outer end of the arm 105 is pulled downwardly by means of a coil spring 107 under tension between a pin 108 in the outer end of the arm and a pin 109 in the lug 110 of the head 101. This detent arrangement is provided for each detent plate 103; that is, the mechanism just described is duplicated at each end of the valve. Thus, the valve element 77 is intermittently moved and indexed for accurate positioning. Each time the main valve element 76 makes a complete revolution, the valve element 77 makes a one-eighth turn. Thus, the positions of the main valve are repeated with shifting variations achieved at the indexed positions of the second valve element.

Figures 6, 7, 8:
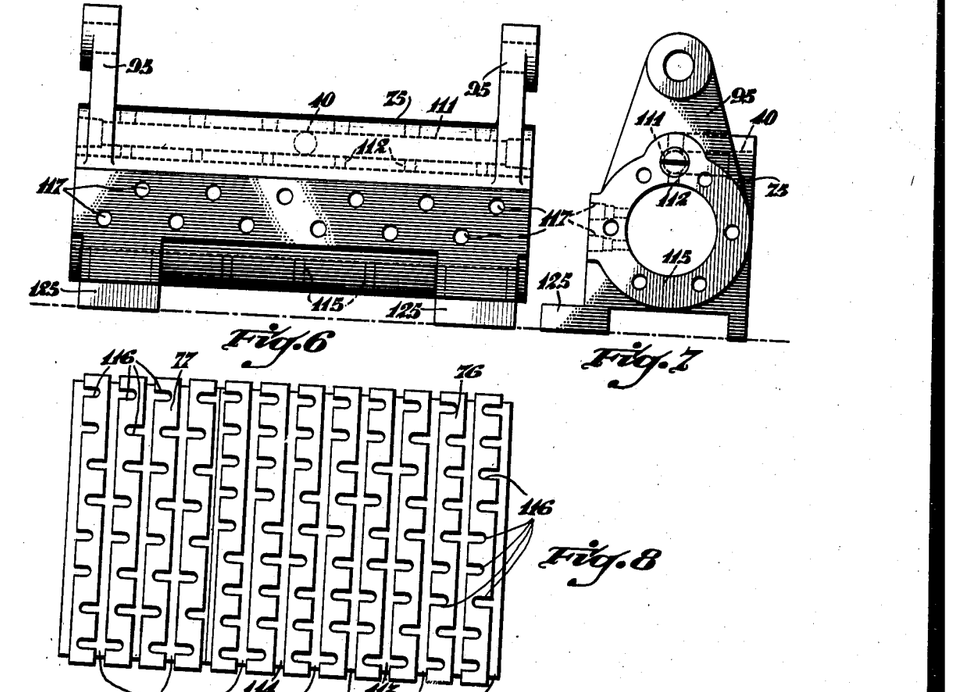
Figure 6 is a side view thereof.
Figure 7 is an end view thereof.
Figure 8 is a developed view, showing the porting and grooving arrangement of the two valve elements.
Figures 9, 10:
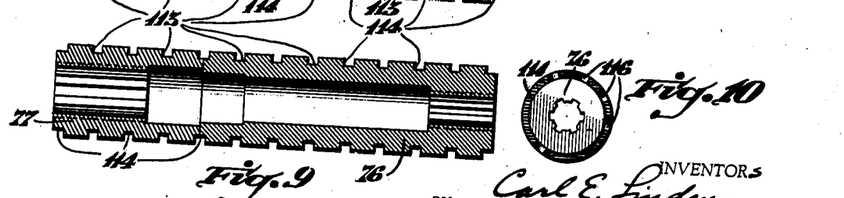
Figure 9 is a longitudinal sectional view of the valve elements.
Figure 10 is an end view of the main valve element.

The delivery line 40 enters a longitudinal bore 111 in the valve casing. From this bore, the oil is distributed radially, inwardly through the six radial ports 112. These ports communicate with circumferential grooves 113, equally spaced along the peripheries of the respective valve elements 76—77. The circumferential grooves 114, disposed between the grooves 113, may be referred to as exhaust grooves. Each of these grooves is in constant communication with the sump, as shown diagrammatically in Figure 16 (see the pipes 115). The grooves 113—114 include longitudinal dead-ended extensions 116, the ends of these grooves cooperating or registering with the ports 117 (Figure 6). Through this arrangement, the ends of the gear-shifting cylinders may be alternately exhausted and charged. The valve casing element includes feet 125 for attaching it in position in the upper end of the head stock casing.

A typical arrangement is shown in Figure 16. The illustration in this figure is diagrammatic of the structure shown in Figure 11, the details of the spindle and spindle sleeve being omitted. A gear-shifting device 42 consists of a cylinder 118 and a piston or plunger 119. The outer end of the plunger carries a yoke 120 engaged with the conventional groove of a coupling element 121. In one position, the coupling element either couples the spindle shaft 122, upon which it is splined with the gear 123, or in another position, couples the shaft with the gear 124.

In the position shown, the shifting plunger has its upper end connected to the exhaust groove 114 by means of a pipe 125, extended into one of the ports 117. The lower end of the cylinder is charged through a pipe 126 extending into one of the ports 117 in communication with a charging groove 113. It will be obvious that the longitudinal, dead-ended slots, determine between them by their arrangement and by the coupling of the pipes the order and sequence of the shifting.

A gauge 130 is interposed in the delivery line 28 for indicating the pressure at which the oil is delivered into the system. Also a gear spray 131 is inserted in the line 28 and is effective for lubricating the transmission.

Description of operation

Speed changes are accomplished in the following manner: Regardless of whether or not the clutch lever 30 is in forward or reverse or neutral, the desired speed may be selected by rotating the crank 78 to bring the dial to the correct point relative to the indicator. The valve elements 76 and 77 have then been set for charging and discharging the proper shifting devices of the system. Assuming that the clutch lever is in the neutral range, movement of the lever 69 will open the valve 39 and the fluid, under pressure, will be admitted to the selector valve and will flow to the respective shifting devices.

The pump 16 runs continuously; that is to say, runs while the radial drill is being used, regardless of whether or not the gears are being shifted or the feed drive motor is being operated. The oil from the pump is delivered into the valve 19. It enters the chamber 22 and will by-pass through the pipe 27 unless the element 21 moves down to cut off the flow through the pipe 27. The fluid also passes through the vent 31 to the chamber above the element 21. This chamber is blocked at all times by the unloader valves. The unloader valve 37 is set to unload at approximately 150 pounds per square inch, which is a pressure suitable for gear shifting, and the unloader valve 33 is set to unload at approximately 500 pounds pressure per square inch, which is the correct pressure for operating the feed driving motor. The delivery pipe 28 is also normally blocked either at the valve 29 or at the valve 39, or both.

Since the unloader valve 37 unloads at approximately 150 pounds, and the pump will develop a greater pressure, and due to the fact that the spring pressure on the valve has been carefully adjusted, the valve 19 will not seat when the delivery line is closed, and the fluid will be by-passed when not being used.

However, when the operator operates the shifting lever 69, assuming the clutch lever to be at neutral, there will be a relief in the delivery side of the line and the valve 21 will seat while fluid is passing through in use. Likewise, if the fluid is used to drive the feed drive motor 49, there will be a relief in the pressure and the valve will seat during the operation of the feed drive motor.

Having pre-set the selector valve to the desired speed when the clutch has been disconnected and the clutch lever is at neutral, operation of the shifting lever 69 will permit the oil to flow through pipes 28, 45, groove 46 of valve 29, pipe 38, through the groove of the valve element 66, through pipe 40 into the pressure grooves of the selector valve and thence through the selected conduits to the proper gear-shifting devices. At this time, pressure in the line 38 will move the automatic valve element 54 to the position shown, and the shifting pressure cannot develop beyond 150 pounds per square inch, at which pressure it unloads through the unloader valve 37 by way of pipe 36 and groove 55.

When the clutch lever is moved to either forward or reverse, the pressure in the line 38 is cut off and the automatic valve element 54 drops down as the oil bleeds back into the sump. Pressure up to 500 pounds will be developed, sufficient for driving the feed drive motor through pipe 28, pipe 45, pipe 47, pipe 48, the throttle valve 50, to the motor and thence into the sump.

Tap lead drive lock-out means

Figure 11:
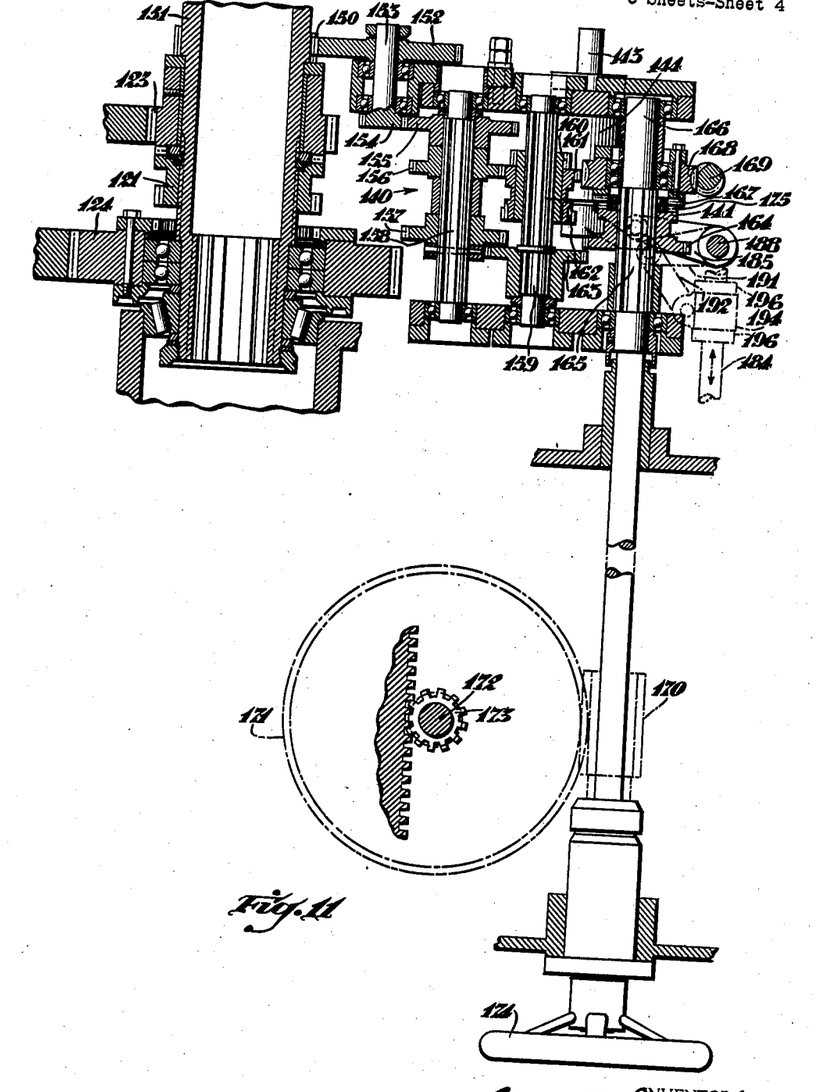
Figure 11 is a general sectional view, showing the tap lead feed transmission relative to the spindle.

The hydraulic feed drive motor 49, being controlled by the throttle valve 50, provides spindle feed rates sufficiently accurate for straight drilling purposes. The utilization of a hydraulic motor for the tool feed is especially desirable because of the infinite number of feed rates provided. The feeds for the tap leads must necessarily be positive. For this purpose, a tap lead transmission, indicated generally at 140, is provided. The transmission is driven from the spindle sleeve and so its rate of speed is always directly proportional to the rate of spindle speed. A manually-operated feed clutch element 141 is provided for changing the feed drive from the hydraulic motor to the mechanical or gear drive from the transmission. When the spindle is being driven in any of the high speed ranges, it would be undesirable to engage any of the tap leads because of the possibilities of tool breakage and the strain which would naturally be placed on the driving parts of the machine.

Figures 12, 14:
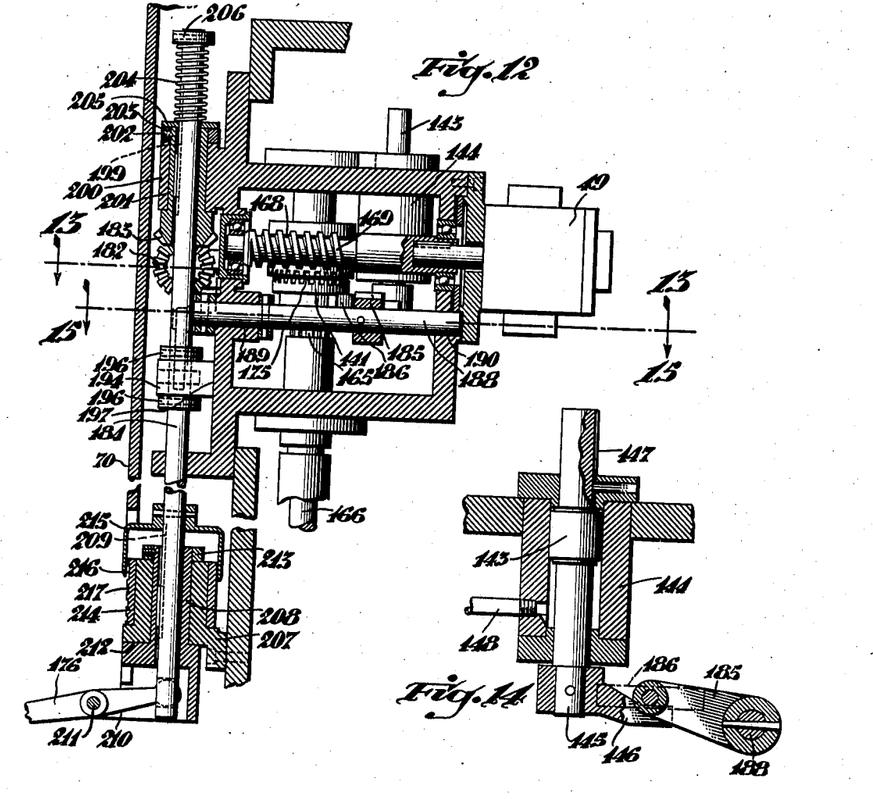
Figure 12 is a sectional view taken on line 12—12, Figure 1, illustrating the hydraulic motor feed drive and its control means.
Figure 14 is a detailed sectional view taken through the lock-out valve for preventing shifting from hydraulic feed to mechanical feed when the spindle is in the high speed range.
Figure 13:
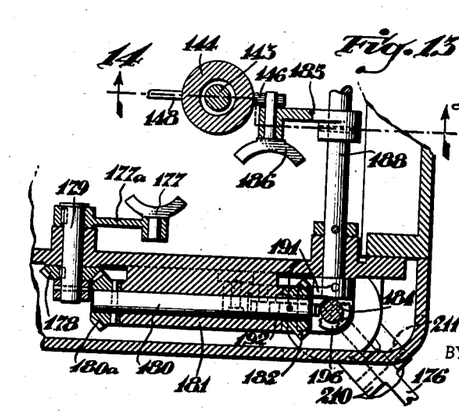
Figure 13 is a sectional view, taken on line 13—13, Figure 12, showing the shifting means for controlling the hydraulic and mechanical feeds.
Figure 15:
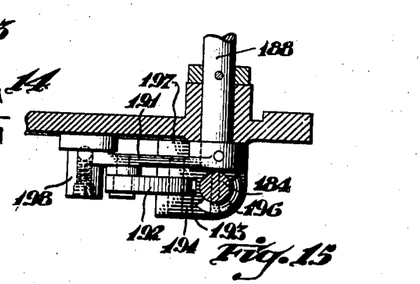
Figure 15 is a sectional view taken on line 15—15, Figure 12.

To insure that an operator will not engage the positive tap feed while the spindle is in the high speed ranges, a hydraulically controlled tap lead lock-out is provided for automatically holding the feed clutch element out of engagement while the high speed ranges are being used. The lock-out comprises a piston 143 slidably mounted in a cylinder 144 and extending through the top and bottom of the casing of the cylinder. The lower extension 145 of the piston or plunger carries an arm 146 pinned thereto. The upper extension of the plunger is splined at 147 so that the plunger cannot revolve as it slides.

An oil line 148 coming into the cylinder 144 below the piston 143 is branched from the line 126 which, when carrying pressure, effects the major speed change in the train of gears driving the spindle. Thus, whenever oil pressure is directed to the gear-shifting device 42 for coupling the smaller gear 123 of the two driven gears on the spindle with the speed drive, the plunger 143, carrying the lock-out arm, is moved upwardly in its cylinder. The oil line 148 is the only opening in the cylinder 144, therefore, the plunger cannot move down unless the line 126 is exhausted.

The tap lead transmission is driven from a gear 150 on the spindle sleeve 151. A gear 152, in mesh with the gear 150 on the sleeve, is keyed to a stub shaft 153, journalled in ball bearings in the top wall of the transmission casing. A pinion gear 154 on the other end of the stub shaft is in mesh with the upper one of a cluster of three gears 155, 156, and 157 respectively, on the inside of the transmission casing. The three gears are fixed on a splined shaft 158 which is journalled in ball bearings in the casing. On a second splined shaft 159, similarly journalled, is a shiftable gear cluster comprising three gears 160, 161, and 162, adapted to mesh with the gears 155, 156, and 157. The six gears shown are proportioned to provide the three standard tap lead changes; namely, 8, 11½, and 14 threads per inch. Below the slidable gear cluster a stationary gear 163 is journalled on the splined shaft 159. This last-mentioned gear is adapted to mesh with a gear 164 on the lower end of the feed clutch element 141.

The feed clutch element is mounted on a splined portion 165 of a shaft 166 and is slidable between the gear 163 of the feed transmission and a crown gear 167 on the lower face of a helical gear or worm wheel 168. The helical gear is journalled in ball bearings on the upper end of the shaft 166 and is in mesh with a worm gear 169 pinned to the forward end of the drive shaft of the hydraulic motor 49. The shaft 166 extends down vertically and carries a worm 170 (shown in dot-dash lines only) for engagement with a gear 171. A shaft 172 extending back from the gear 171 carries a pinion 173 which is in mesh with a feed rack on the spindle sleeve. This arrangement of parts for the feed drive is according to customary practice and is therefore not shown in more detail. The shaft 166 continues down and extends to the outside of the machine. A hand wheel 174 is provided on the shaft 166 at the outside of the machine for manual operation of the feed mechanism.

The feed clutch element 141 has three positions. When up, a crown gear 175 on the top face meshes with the crown gear 167 and the feed is from the hydraulic motor. When down, the clutch element engages the gear 163 and the feed is from the transmission. In the intermediate position, both hydraulic and positive feeds are disengaged, and the feed can be operated manually by the hand wheel. The shiftable gear cluster, comprising gears 160, 161, and 162, also has three positions. Both the gear cluster and the clutch element are operated by a single hand lever 176. The lever has two movements, a horizontal swinging movement for shifting the gear cluster and a vertical pivotal movement, for operating the clutch 141.

The slidable cluster of gears is shifted by a yoke 177, the arm 177a of which is keyed to a shaft 179 journalled in the front wall of the feed transmission casing. The shaft 179 extends through to the front of the casing and carries a bevel gear 178. The arm of the yoke, extending at right angles to the shaft 179, imparts an arcuate movement to the yoke. To compensate for this, the yoke 177 is free to swing on a pin at right angles to the arm in the end thereof. The bevel gear 180a is pinned to the end of a horizontal shaft 180 which is journalled in a bearing 181 at the front of the casing. A similar bevel gear 182 at the other end of the shaft 180 is in mesh with a bevel gear 183 (Figure 12) keyed to a vertical shaft 184.

The shaft 184 is moved by the hand lever 176. As stated before, the hand lever has two swinging movements. The horizontal movement revolves the bevel gear 183 to shift the gear cluster through the connection just described. The hand lever has three positions in its horizontal movement to correspond to the three positions of the gear cluster. Therefore, conventional detent means (not shown) are provided to index the cluster in any one of these positions.

The clutch element 141 (Figure 16) is shifted by an arm 185 carrying a yoke 186 riding in a groove 187 in the clutch element. The yoke 186 is journalled in the arm in the same manner as the yoke 177 to compensate for the arcuate movement of the arm. The arm 185 is pinned to a shaft 188 journalled in the casing at 189 and 190. The yoke for shifting the clutch element is moved by the vertical pivotal movement of the hand lever 176.

To transmit the necessary rotary motion to the shaft 188 from the reciprocating movement of the vertical shaft 184, a pair of links 191 and 192 are provided. The link 191 is pinned to an extension of the shaft 188 which passes through the front wall of the casing. The link 192 is pivotally connected to the link 191 at its one end and has its other end pivoted in a slot 193 in a collar 194. The collar 194 is not influenced by the rotative action of the vertical shaft 184 since it is on the shaft between two pinned collars 196—196, and has its side flattened, as at 197, for sliding engagement with the front wall of the transmission casing. The link 191 is extended beyond its connection to the link 192 and is provided with a bushing 198 housing a spring urged ball constituting detent means for holding the yoke in its various positions. Three recesses, appropriately placed for the three positions, seat the ball.

The bevel gear 183 is keyed to the vertical shaft 184 in a long keyway 199. The bevel gear is therefore only influenced by the rotative movement of the vertical shaft. The vertical shaft is journaled at its upper end in a block 200 at the front of the transmission casing. The bevel gear 183 is provided with a long bearing sleeve 201 and is journaled inside of the block 200 and held therein by a set screw 202 threaded through a collar 203 on top of the block. The vertical shaft passes through the sleeve 201, the block 200, and the collar 203 and extends above them. A coil spring 204 disposed around the vertical shaft between a washer 205 resting on the collar 203 on top of the block and a collar 206 pinned to the very upper end of the shaft, provides a counterbalance for the shaft. This is provided so that the shaft is easily shiftable vertically.

The lower end of the vertical shaft is journalled in a bearing 207 bolted to an inner wall of the headstock. A sleeve 208 keyed to the vertical shaft within the bearing 207 provides a bushing for the bearing. The key is slidable in a long keyway 209 so that the vertical shaft is free to slide up and down therethrough. The lower end of the sleeve is enlarged and provided with arms 210—210 for pivotally journaling the shifting lever 176 therebetween on a cross pin 211. The enlarged portion of the sleeve 208 provides a shoulder 212 which rests against the lower face of the bearing 207 and cooperates with a collar 213 around the upper end of the sleeve 208, thus holding the sleeve in place in the bearing 207. This arrangement permits the sleeve to rotate in the bearing but retains it against vertical movement.

The indicia 217 for the various positions of the shifting arm are on a stationary sleeve 214 mounted on and around the bearing 207. An inverted cup-shaped element 215, having a pointer 216 depending from the front edge thereof, is pinned to the vertical shaft above the bearing. The pointer therefore moves both rotatively and reciprocably with the vertical shaft.

*Operation of the lock-out means*

When the spindle is in the lower speed ranges; that is, when the gear 124, the larger of the two on the spindle, is being driven, the side of the cylinder for the shifting device 42 which controls the engagement of gear 123 (the high speed range gear) is exhausted. Therefore, the oil line 148 to the lock-out is also exhausted, since it branches from the line 126. With the oil line 148 exhausted, the plunger 143 carrying the lock-out arm 146 is free to be moved down. The pin on the yoke 186, mounted in the shifting arm 185, is extended through this arm and is adapted to rest on the top of the arm 146 carried by the plunger 143 when the plunger is up and the clutch element is in neutral. Therefore, the lock-out device, when under oil pressure from the line 148, locks the clutch element 141 from engagement with the mechanical feed transmission. The lock-out occurs when the clutch element is in neutral, thus the hand feed can be utilized. Also, the lock-out arm being below the extended pin on the yoke 186, permits the clutch element to be moved up into hydraulic feed connection.

Having described our invention, we claim:

1. A hydraulic system for shifting the gears of a transmission, comprising a fluid pump, a relief valve, an unloader valve adapted to control the pressure of the fluid delivered by said pump and adapted to bypass the fluid when delivery is blocked, a main clutch lever for coupling power to said transmission, a valve operated by said lever and adapted to be held in open position when the clutch is in neutral, a shifting valve, a selector valve receiving fluid under pressure through said clutch lever operated valve and said shifting valve when said valves are open, and shifting devices operated by said shifting valve as selected by said selector valve.

2. A hydraulic system for shifting gears and feeding a spindle, comprising a source of fluid pressure, means for regulating the pressure, a spindle feed driving motor, a selector valve for distributing the fluid for the shifting operations, a clutch lever controlled valve for directing the fluid either to the selector valve or to the spindle feed driving motor, and a manually controlled shifting valve interposed between the clutch lever controlled valve and the selector valve, whereby the fluid can be directed by said clutch lever controlled valve for permitting shifting of gears when the clutch is in neutral and feed driving when the clutch is in forward or reverse positions.

3. A hydraulic speed changing and spindle operating system, comprising a fluid pump, a control valve, a shifting valve, a selector valve, gear shifting devices, a conduit system for supplying fluid to and through the respective elements in the order named, a relief valve interposed in the system between the pump and the control valve, a clutch control lever for the spindle, said clutch control lever connected to said control valve, a spindle feeding hydraulic motor having fluid connection to said control valve, said control valve in the neutral position of said clutch lever adapted to deliver the fluid to the gear shifting devices by way of the shifting valve and selector valve and in its drive coupling positions adapted to connect the fluid to the spindle feeding motor, an automatically operated valve operated by pressure in the system between the control valve and the shifting valve, unloader valves, one directly connected to the relief valve and the other connected to the relief valve through the automatic valve, said relief valve including a valve element normally unseated by fluid pressure when the system to the selector valve and hydraulic motor is closed and including a port therethrough permitting the flow of fluid above the same to the unloader valves for causing the relief valve to close off the bypass when the fluid is being used either for shifting or driving.

4. A mechanism for controlling the driving of tap lead feeds, comprising a spindle, a shifting device for connecting either high or low speed drive to said spindle, a transmission driven from said spindle for tap lead feed, a hydraulic motor for alternatively driving said tap lead feeds, said transmission including a feed clutch element for alternatively coupling the transmission to said tap feeding means or for coupling the hydraulic motor thereto, means for locking said feed clutch element for movement either in intermediate neutral position or in hydraulic driving position, said locking means preventing coupling to said tap lead gear transmission when the high speed drive is coupled to said spindle, a plunger supplied with fluid from the shifting device controlling the coupling of the low and high speed ranges to the spindle, said locking means being charged when the high speed range is coupled.

5. A hydraulic system for controlling and operating a drill spindle, comprising a fluid pump, a control valve, a shifting valve, a selector valve, gear shifting devices, a conduit system for supplying fluid to and through the respective elements in the order named, a relief valve for controlling the fluid pressure, said relief valve interposed in the system between the pump and the control valve, a clutch control lever for the spindle, said clutch control lever connected to said control valve, a spindle operating hydraulic motor having fluid connection to said control valve, said control valve in the neutral position of said clutch lever adapted to deliver the fluid to the gear shifting devices by way of the shifting valve and selector valve and in its coupling positions adapted to connect the fluid to the spindle operating motor.

6. A hydraulic system, comprising a spindle operating transmission, a fluid pump, a control valve, a shifting valve, a selector valve, gear shifting devices, a conduit system for supplying fluid to and through the respective elements in the order named, and a clutch control lever for the spindle, said clutch control lever connected to said control valve, said control valve in the neutral position of said clutch lever adapted to permit delivery of the fluid to the gear shifting devices by way of the shifting valve and selector valve.

7. A hydraulic gear-shifting apparatus, comprising, a fluid pump for delivering fluid under pressure, a selector valve, means for pre-setting said selector valve, gear-shifting devices served by said selector valve, conduit means connecting said pump to said selector valve, a clutch lever for controlling the power for the gears, manually operated valve means in the conduit, and means between the pump and the selector valve for preventing delivery of fluid to the selector valve unless the clutch lever for controlling the power is in neutral.

8. A hydraulic system for shifting gears and feeding a spindle driving the gears, comprising, a spindle, gears driven by the spindle, gear-shifting devices, a clutch lever for controlling the power to the gears, a hydraulically operated spindle feed motor, fluid delivery means, a selector valve controlling the delivery of fluid to the respective shifting devices, and a valve operated by said clutch lever for causing delivery of fluid to the selector valve when the clutch lever is in neutral and delivery of fluid to the feed motor when the clutch lever is in position for coupling the power.

9. A hydraulic system for changing gears, comprising a fluid pump, a relief valve, a delivery conduit passing through the relief valve, an exhaust conduit from the relief valve, said relief valve including a shiftable element having a vent therethrough to permit the application of fluid pressure to both sides of the element, an unloader valve in connection with the relief valve on the side of the shiftable element opposite to the delivery and exhaust side, a speed selecting valve, shifting devices controlled thereby, valve means interposed between the relief valve and the selector valve and permitting delivery of fluid to the selector valve, said unloader valve limiting the pressure at which the fluid is delivered and permitting the shiftable valve element in the relief valve to remain in by-pass position when the control valve is closed and the supply is blocked to the selector valve.

10. Mechanism for operating a drill spindle for tap lead feeds, comprising means for rotating the spindle, a tap lead transmission driven from said spindle and having operative connection for feeding a spindle, a feed clutch element, a hydraulic motor in said transmission for directly feeding said spindle, said feed clutch element adapted to either connect said hydraulic motor to said spindle or said tap lead transmission to said spindle, feed clutch shifting means, driving gears in said spindle rotating means for said spindle for driving the same in low and high speed ranges, a hydraulic shifting device for said driving gears, a hydraulically operated plunger device connected to that side of the hydraulic shifting device which is charged when the spindle driving gears are in the high speed range, locking arms on the plunger and feed clutch shifting means adapted to be engaged for preventing movement of the feed clutch element to tap lead transmission connection when the high speed spindle driving range is being used.

11. Mechanism for operating a drill spindle for tap lead feeds, comprising means for rotating the spindle, a tap lead transmission driven from said spindle and having operative connection for feeding the spindle, a feed clutch element and, a hydraulic motor in said transmission for directly feeding said spindle, said feed clutch element adapted to alternatively connect said hydraulic motor to said spindle and said tap lead transmission to said spindle.

12. Mechanism for operating a drill spindle for tap lead feeds, comprising driving gears for rotating the spindle, a tap lead transmission driven from said spindle and having operative connection for feeding a spindle, a feed clutch element, a hydraulic motor in said transmission for directly feeding said spindle, said feed clutch element adapted to either connect said hydraulic motor to said spindle or said tap lead transmission to said spindle, said driving gears for said spindle adapted to drive the same in low and high speed ranges, a shifting device for said driving gears, and locking means adapted to be moved by said shifting device for preventing movement of the feed clutch element to transmission connection when the high speed spindle range is being used.

13. Apparatus for driving a spindle for tap lead feeds, comprising a hydraulic motor, a transmission extending from a rotative connection to the spindle to a translative connection to the spindle, a shaft in said transmission carrying a hand wheel, a feed clutch element having a splined slidable connection on said shaft, a hydraulically driven means loosely mounted on the shaft and adapted to be coupled thereto by means of the feed clutch element, said feed transmission adapted to be coupled to the shaft through said feed clutch element, and means for preventing movement of the feed clutch element into transmission connection when the spindle is being driven in high speeds.

14. A mechanism for operating a drill spindle for forming tap leads, comprising a spindle, means for rotating said spindle in high and low speed ranges, hydraulic means for shifting from one range to the other, a tap lead transmission driven from the spindle including a translative connection thereto, hydraulic means for feeding said spindle, a feed clutch element for alternatively connecting said hydraulic means and said transmission to said spindle, and a lockout device for locking the feed clutch element out of the transmission drive position when the rotating means is coupled to the spindle in the high speed range.

15. In a spindle feeding mechanism, a spindle feeding shaft, a speed change gear transmission for driving said feed shaft at high and low ranges of speed, a hydraulic motor for driving said shaft, a feed clutch element for alternatively connecting either said hydraulic motor to said shaft or said transmission to said shaft, and means for locking said feed clutch element out of transmission driving position when the high speed range is being delivered.

16. Two alternative feed drives for a spindle, comprising a hydraulically shifted gear change transmission for driving said spindle in high and low speed ranges and including a range changing device, a hydraulic motor, a mechanical drive through a transmission driven from the spindle, hand operated shifting means for engaging either one of the feed drives to the spindle, and a safety lock-out device for locking the shifting means from engaging the mechanical transmission when the spindle is being driven in its high speed range, comprising a hydraulically operated plunger charged from the speed range changing device for the spindle driving transmission when the high speed range is connected for holding the lock-out device in lock-out position.

CARL E. LINDEN.
RAYMOND H. McCLELLAN.